Sept. 2, 1969  J. L. SAKSUN  3,464,323
PISTON
Filed Sept. 12, 1967  2 Sheets-Sheet 1
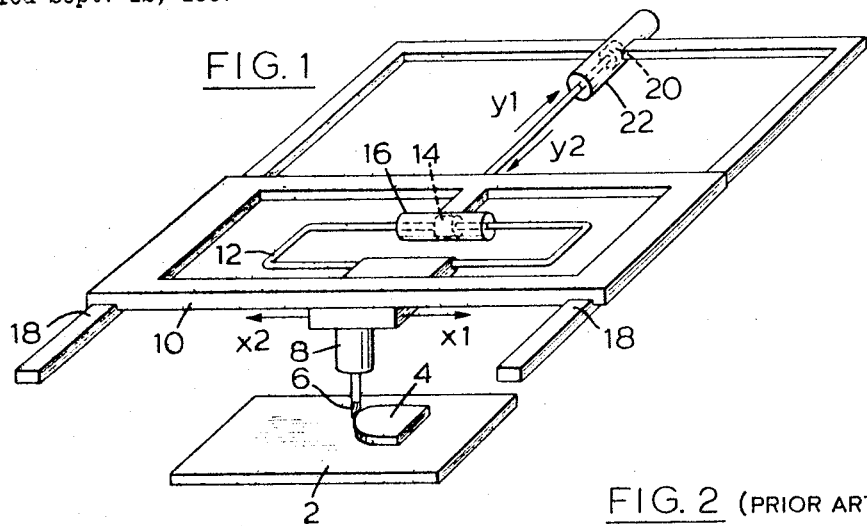
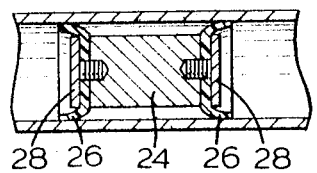
FIG. 2 (PRIOR ART)
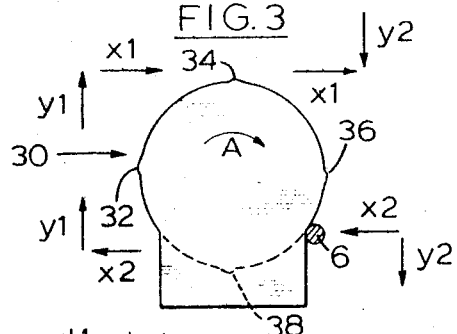
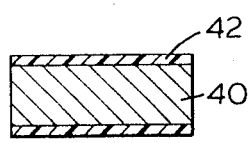
FIG. 4
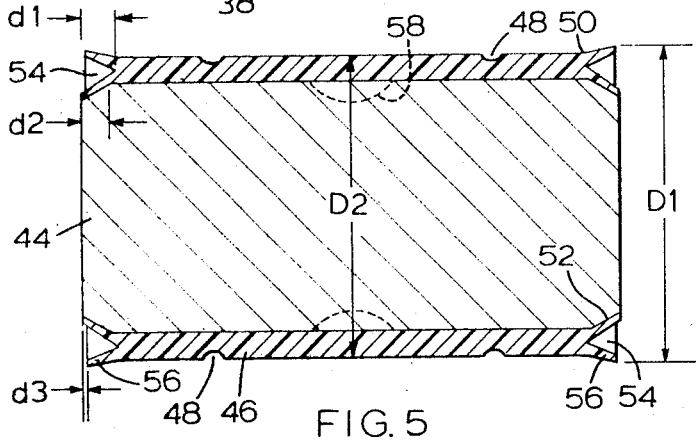
FIG. 5
INVENTOR.
JOHN L. SAKSUN
BY
Rogers, Bereskin, & Parr INVENTOR.
JOHN L. SAKSUN
BY Rogers, Bereskin, & Parr United States Patent Office 3,464,323
Patented Sept. 2, 1969

3,464,323
PISTON
John L. Saksun, 27 Blair Athol Crescent,
Islington, Ontario, Canada
Filed Sept. 12, 1967, Ser. No. 667,274
Int. Cl. F16j 1/00, 9/00
U.S. Cl. 92—243                    2 Claims

ABSTRACT OF THE DISCLOSURE

A piston having a metal core, and a tough, thick, resilient, oil-resilient urea-urethane sleeve bonded to the core along the entire length of the core, to provide a good seal and to eliminate seal flexure upon reversal of piston direction in a cylinder. The sleeve diameter at its ends is slightly greater than the cylinder diameter. The middle of the sleeve is preferably slightly less than the cylinder diameter and joins the sleeve ends by a smooth taper.

---

This invention relates to a piston for use in hydraulic machinery. More particularly, it relates to a construction for a piston to be used as an actuator in metal working machinery, where extremely high accuracy is required. The piston is also suitable for use (provided that it is not subjected to high temperatures) in other types of equipment, as will be discussed, including pneumatic equipment.

In the past, pistons used in the cylinders of hydraulic actuators for metal working equipment have used flexible cup-shaped seals, one at each end of the piston, to seal the piston in the cylinder. These seals are used to supplement or replace piston rings, which normally do not provide an adequate seal in high accuracy equipment because of the usual split in the rings. The complexity and expense of the cupped seals increases with the hydraulic pressure which they are called upon to withstand, so that it is usually necessary for machine shops to stock several different types of seals, for various pressures.

A major disadvantage of the cupped seals is that when pressure is removed from one face of the piston and applied to the other to reverse the direction of the piston, the walls of the cupped seal tend to flex, creating a discontinuity in the work being machined, as will be explained in more detail shortly. Such discontinuities are highly undesirable in work that is machined to close tolerances, and they are particularly objectionable in work that would otherwise have substantially a mirror finish.

Accordingly, it is an object of the present invention in one of its aspects to provide a piston construction in which the piston is provided with a seal in which substantially no flexing occurs with reversal of pressure. This eliminates the bulk of the discontinuities mentioned above. In addition, the seal to be described is effective over a wide range of pressure, thus reducing the necessity for purchase and storage of different types of seals.

In a typical embodiment of the invention, a sleeve of tough, resilient material (typically a urea-urethane elastomer), resilient to creep and set under load, and of substantial thickness, is bonded to a metallic (e.g., aluminum) core to form a piston. The sleeve encircles the core and extends the length of the core, and is, at least at its ends, of diameter slightly greater than the diameter of the cylinder in which the piston is to be inserted. The sleeve, which is of substantially thickness, forms a tough, resilient sealing member substantially free from flexing upon reversal of pressure in the cylinder, because of the continuity of the sleeve along the length of the piston.

Since the sleeve is relatively thick, it tends to yield should the piston rod become bent, and it thus reduces the likelihood of damage to the cylinder and seizure of the piston in the cylinder upon distortion of the piston rod or cylinder. The piston thus has advantages for use in aircraft landing gear and other installations which are subject to shocks that may distort the piston or cylinder.

If desired, virtually the entire piston body (except for the piston rod) may be made of a tough resilient material of the type mentioned. This not only increases the yieldability of the piston, but it also may save weight (the density of urea-urethane elastomers is about one third that of aluminum), an important consideration in aircraft installations. When virtually the entire piston body is of tough, resilient material of the type mentioned, it may, depending on the application intended, be secured to the piston rod in a manner other than by bonding.

The invention will be more fully understood with reference to the accompanying drawings, in which:

FIG. 1 is a diagrammatic perspective sketch of a portion of a machine tool in which the present invention may be used;

FIG. 2 is a side section of a typical prior art piston construction;

FIG. 3 is a top view illustrating typical discontinuities in a disc cut using a piston such as that shown in FIG. 2;

FIG. 4 is a side section of a piston according to the present invention;

FIG. 5 is a side section of a preferred embodiment of a piston according to the present invention;

Figure 6:
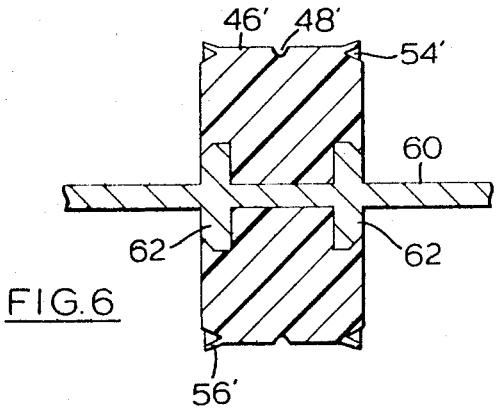
FIG. 6 is a side section of another embodiment of a piston according to the invention.

Reference is first made to FIGURE 1, which shows (very diagrammatically) a portion of a typical metal working machine in which the present invention may be used.

The machine includes a work table 2 on which is stationed a work piece 4, the work piece being shaped by a cutter 6 carried by a motor 8. The motor is slidably mounted on a frame 10 for movement in directions $x1$, $x2$. Propulsion is achieved by a generally U-shaped piston rod connected to the motor and to a piston 14 slidable in a cylinder 16. The cylinder is connected to the frame 10.

Movement of the motor 8 and cutter 6 is directions $y1$, $y2$ is achieved by slidably mounting the frame 10 on slides 18, propulsion being derived from piston 20 slidable in a cylinder 22.

In use, the cylinders 16, 22, which are double acting, are supplied with pressurized oil (from a source not shown) in a manner determined by a template or pattern, so as to cause the motor 8 to move so that the cutter 6 will cut the work piece 4 in the form of the pattern.

FIGURE 2 illustrates a typical prior art piston 24 of the type commonly used in the cylinders of metal working machines such as that shown in FIGURE 1. The piston 24 includes, at each end, a cup-shaped seal 26, normally made of leather, rubber, neoprene, or suitable plastic materials, the seals 26 being clamped to the ends of the piston by plates 28.

(No piston rods are shown in FIGS. 1 to 5 of the drawings; in practice, the pistons illustrated will be fitted to piston rods in a conventional manner.)

FIGURE 3 illustrates a typical partly cut disc 30 formed using pistons such as that shown in FIG. 2 in the cylinders 14, 22 of a machine of the type shown in FIGURE 1. It is assumed that the cutter 6 traces around the periphery of the disc in the direction shown by arrow A, and the arrows $x1$, $y1$, $x2$, $y2$ show the directions of movement of the pistons 14, 22 in the cylinders during the various stages of cutting.

It will be noticed that the disc 30 contains discontinuities indicated at 32, 34 and 36 in its periphery. A further discontinuity 38 will be formed when the disc 30 is completely cut. These discontinuities occur each time one of the pistons changes direction in its cylinder, and are caused by flexing of the seals 26 in the cylinder when the pressure is shifted from one face of the piston to the other. For example, the discontinuity 36 is caused when the direction of movement of the piston 14 in cylinder 16 changes from direction $x1$ to direction $x2$. The effect is comewhat analogous to that of backlash in gears.

In a typical metal working machine using pistons of five inch diameter, with two plastic packings or seals at each end of the piston, and three piston rings, the discontinuities referred to were approximately 9 to 11 thousandths of an inch in height. In a similar machine using piston rings only, without flexible seals, the discontinuities were reduced but were still 3 to 4 thousandths of an inch in height, due to the fact that a piston ring requires at least 2 thousandths of an inch axial clearance to function properly.

FIGURE 4 illustrates a seal according to the present invention which reduces the discontinuities to between 1 and 2 thousandths of an inch in height. The remaining small discontinuities are due primarily to slight compression of the oil and cannot be eliminated by improving the piston seals.

The piston of FIGURE 4 includes a metal core 40 (typically aluminum) to which is bonded a sleeve 42 of a touch, resilient material. The sleeve 42 extends the entire length of the piston and is normally at least 1/8 inch in thickness. In a preferred embodiment of the invention, the sleeve 42 is 1/4 of an inch thick, and it may be much thicker (e.g., one inch or even more) if desired.

The material of which the sleeve 42 is made is important. This material must be abrasion resistent, unaffected by oil, resilient, resistent to tearing, nonporous (to provide a good seal at high pressure), able to bond strongly to metal, and highly resistent to set or creep under load.

In the FIG. 4 piston, the sleeve 42 is made of diameter just slightly larger than that of the cylinder (typically by about 3 thousandths of an inch), so that when the piston is inserted in the cylinder, the sleeve 42 is compressed slightly. This forms a good seal. Since the sleeve 42 is continuous along the length of the piston, there are no thin walls to flex when the pressure is shifted from one face of the piston to the other, and therefore there is substantially no flexing to cause discontinuties of the type shown in FIGURE 3.

It is found in practice that the best material for the sleeve 42 is a urea-urethane elastomer. Nylon is unsatisfactory, since it has insufficient abrasion resistence, and since its elastic properties are so poor that if a piston with an oversize nylon sleeve were inserted into a cylinder, it would be virtually impossible to move the piston, because of the pressure of the nylon on the cylinder. Teflon cannot be used for the same reason; it is not sufficiently elastic.

In practice, typical urea-urethane elastomers utilized for the sleeve 42 are formed by using commercially available prepolymers such as those known under the trade marks Adiprene L167 or L200 (Du Pont), Cyanaprene D5 or D6 (American Cyanamid), Formrez P610 or P611 (Witco Chemical Company), or Vibrathane 6006 or 6009 (Uniroyal Company) and reacting the chosen prepolymer with an aromatic amine of the type methylene-o-bis-chloraniline or dichloro benzidine at an amine equivalent ratio of 85% to 100%. The two main reactants are in liquid state and are physically mixed together at temperatures ranging from 150° F. to 220° F. The addition of the amine to the prepolymer causes a reaction between the free isocyanate groups of the prepolymer and the amine groups of the aromatic amine, causing an addition reaction which produces both longer molecules (chain extension) and interaction (cross linking), thereby converting a liquid resin (prepolymer) into a solid elastic (urea-urethane) after a period of time which varies from two minutes to twenty minutes.

While the mixture of prepolymer and amine is still in the liquid state, the mixture is poured into a suitable mold set around the metal piston core, so when the reaction is complete and the mixture has assumed a solid state, the resulting solid is in a shape dictated by the enclosing mold.

In order to achieve a strong enduring bond between the urethane material and the metal piston, the procedure is as follows.

The surface of the metal piston core is first cleaned mechanically by subjection to a compressed air propelled blast of sand, glass beads, iron or steel grit, aluminum oxide or similar material whereby all surface dirt, scale, rust, etc., is removed, to provide a clean virgin metal surface. The cleaned surface is then further cleaned by dunking, washing or vapour cleaning with a suitable solvent such as trichloroethane to assure complete absence of any oil or grease. The cleaned metal surface is then given two coatings of a suitable chemical primer such as those sold under the trade marks Thixon XAB936 or 894 (Dayton Chemical Products Laboratories). The primer is of nature such that a chemical bond is established between the metal and the primer, and between the primer and the urethane.

After the two coats of the primer have been brushed or sprayed onto the metal piston core, the piston core is placed inside a suitable mold (not shown) so that there is a gap between the piston core and the outer mold that can be filled with liquid urethane mixture. The assembled piston and mold (without the liquid urethane) is placed in a hot air oven for a length of time necessary to ensure (a) that all retained solvent is evaporated from the primer, and (b) that the complete assembly reaches a stabilized temperature state suitable for the casting of the urethane. This temperature is usually 212° F. within normal commercial tolerances.

When the metal assembly and mold have reached the desired temperature, and when the liquid prepolymer has been heated to the desired mixing temperature and when the aromatic amine has been melted, the combining of the prepolymer and amine is effected by mechanical stirring, under a vacuum of at least 20 mm. of mercury. Mixing under vacuum, or subsequent exposure to vacuum of the mixed system, is used to eliminate any porosity in the final cast product that might detract from the working efficiency of the piston seal.

The complete metal piston assembly, with the urethane sleeve retained by the mold, is subjected to continuing heat in the hot air oven at about 212° F. for a period of time not less than three hours, and up to 24 hours if desired.

The assembly of the metal piston core with the bonded urethane sleeve is then cooled to room temperature and is allowed to mature for one week to achieve maximum physical strength.

Typical specific urethane compositions that may be used for the piston sleeves are as follows.

EXAMPLE 1

A prepolymer, marketed under the trade mark Adiprene L–167 by E. I. du Pont de Nemours & Company, made by reacting polytetramethylene ether glycol with toluene diisocyanate to a final active isocyanate content of 6.0% to 6.6%, is reacted with 4,4′-methylene-bis(2-chloraniline) in the following proportions:

| | Parts by weight |
|---|---|
| Adiprene L–167 | 100 |
| 4,4′-methylene-bis(2-chloraniline) | 19.5 |

Cured in air for 3 hours at 212° F. followed by a room temperature maturation period of 3 to 7 days. Hardness: 95 Shore A.

EXAMPLE 2

A prepolymer, marketed under the trade mark Multrathane F–66 by Mobay Chemical Company, made by reacting a polyester resin with a polyisocyanate to a final active isocyanate content of 6.3% to 6.7%, is reacted with trimethylol propane (an aromatic diol marketed under the trade mark Multrathane XA by Mobay Chemical Company) in the following proportions:

| | Parts by weight |
|---|---|
| Multrathane F–66 | 100 |
| Multrathane XA | 4.5 |
| 1,4-butanediol | 14.3 |

Cured for 3 hours in air at 212° F. followed by a room temperature maturation period of 3 to 7 days. Hardness: 94 Shore A.

EXAMPLE 3

A prepolymer, marketed under the trade mark Formrez P–611 by Witco Chemical Company, made by reacting a polyester with a diisocyanate to a final active isocyanate content of 6.0% to 6.3% is reacted with 4,4′-methylene-bis(2-chloraniline), in the following proportions:

| | Parts by weight |
|---|---|
| Formrez P–611 | 100 |
| 4,4′-methylene-bis(2-chloraniline) | 17.5 |

Cured for 3 hours in air at 212° F. followed by a room temperature maturation period of 3 to 7 days. Hardness: 55 Shore D.

EXAMPLE 4

A prepolymer, marketed under the trade mark Formrez P–610 by Witco Chemical Company, made by reacting a polyester with a diisocyanate to a final active isocyanate content of 6.0% to 6.3%, is reacted with 4,4′-methylene-bis(2-chloraniline), in the following proportions:

| | Parts by weight |
|---|---|
| Formrez P–610 | 100 |
| 4,4′-methylene-bis(2-chloraniline) | 18 |

Cured for 3 hours in air at 212° F. followed by a room temperature maturation period of 3 to 7 days. Hardness: 55 Shore D.

Generally, urethanes suitable for use in the present invention preferably have a hardness of between about 95 Shore A and 55 Shore D, elastic properties indicated by a Bashore Rebound value of 30% to 50%, resistance to compression set indicated by an A.S.T.M. Method B value of 25% to 35%, resistance to tearing indicated by A.S.T.M. Die C. value of about 500 pounds per inch or more, tensile strength at break of about 5,000 p.s.i., and elongation at break of about 400% or more.

The term "urea-urethane" refers to the order in which the reactions proceed to form the urethane. A urethane generally is formed by reacting a polyol, an isocyanate, and an amine. If the polyol and the amine react first, there will be too much cross linking and not enough chain extension, and the resulting product will not be sufficiently tough or oil resistant. If the polyol and isocyanate react first, adequate chain extension will occur, and this type of elastomer is known as a urea-urethane. Urea-urethanes are produced when the materials of the examples are used.

Reference is next made to the FIG. 5 embodiment of the invention. The FIG. 5 embodiment was developed because it was found that in the FIG. 4 embodiment, considerable pressure was needed to force the piston through its cylinder, due to the compression of the sleeve 42, over its entire surface, between the piston core and the cylinder. In the FIG. 5 embodiment the area of the sleeve that is compressed is reduced, thus reducing the propulsion force needed for the piston.

In the piston of FIGURE 5, the metallic core is indicated at 44 and the urethane sleeve at 46. The diameter D1 of the sleeve 46 at the ends of the piston is typically made 20 thousandths of an inch greater than the diameter of the cylinder, to ensure a good seal. The diameter D2 of the piston and sleeve assembly along its midportion, apart from the recesses 48, is made between 5 and 20 thousandths of an inch less than the diameter of the cylinder. The transition between the ends and the midportion is made by a gentle taper 50 at an angle typically of about 10°. The surface of the taper may be straight, concave or convex as desired, so long as it is relatively gentle, without sharp discontinuities.

The average thickness of the sleeve 46 is about ¼ inch (although it may be as little as ⅛ inch if desired). To reduce the possibility of peeling of the sleeve from the piston core under load, the edges of the piston core are bevelled, as shown at 52. The amount of bevel is variable, a typical slope being about 30°.

In order to render the edges of the sleeve more flexible, axial recesses may be formed in the end surfaces of the sleeve as shown at 54, so that the outer edges of the sleeve form lips 56. The thickness of each lip 56 will typically be between 20 and and 60 thousandths of an inch. The axial depth $d1$ of each recess will normally be slightly greater than the axial depth $d2$ of the bevel (e.g., by about 50 thousandths of an inch) to improve the flexibility of the lips 56. The edges of the lips 56 are set back slightly (as indicated by dimension $d3$) from the end faces of the piston so that when the piston is inserted in a cylinder and moved to the end of the cylinder, the lips 56 will not strike the end of the cylinder.

Refuse collectors 48, in the form of narrow circumferential slots around the sleeve, may be provided to trap material working its way from one side of the piston to the other. The slots 48 are rounded in cross section, to avoid sharp discontinuities in the sleeve surface. This is more important if the piston core and sleeve are short so that the refuse collectors are near the lips 56.

If desired, the piston core may be recessed, e.g., as shown at 58, to provide a type of interlock between the urethane sleeve and the piston core, to supplement the strength of the bond between the two. However, a structure of this sort is not usually necessary, since the bond is between the entire inner surface of the sleeve and the entire outer surface of the core, and will, if properly prepared, withstand pressures of up to 25,000 p.s.i. in shear. Typical pistons of the type shown in FIGURE 5 have been tested up to 500 p.s.i. in liquid, and substantially no leakage, and substantially no sleeve flexing on reversal of piston direction, have occurred.

If desired, the bulk of the core 44 may be eliminated, so that most of the piston is urethane, the urethane being cast onto and bonded directly to the piston rod (the piston rod thus forms the necessary hard inner core). This construction is illustrated in FIG. 6, where primed reference numerals indicate parts corresponding to those of FIG. 5. In the piston of FIG. 6, the piston rod is indicated at 60 and includes a pair of generally disc-shaped enlargements 62 to improve the mehcanical strength of the connection between the urethane and the piston rod. The enlargements 62 achieve this effect by increasing the area of the bond between the piston rod and the urethane, and by providing radially oriented surfaces which oppose stripping of the urethane from the rod. In the case of a relatively large diameter piston rod, and where low pressures only are to be used, the enlargements 62 may not be required.

Figure 7:
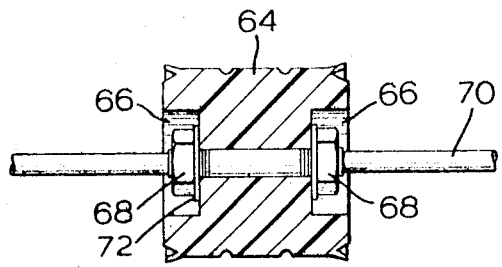
FIG. 7 is a side section showing a modification of the piston of FIG. 6.

In some applications, it may be desirable to eliminate the bond between the piston rod and the urethane, and to attach the urethane sleeve to the piston rod by means of bolts. Such an arrangement is shown in FIG. 7, where a urethane body is indicated at 64 containing enlarged bores 66 for lock nuts 68. The nuts 68 are threaded onto a piston rod 70 and bear against washers 72 to hold the urethane body on the piston rod.

The nuts 68 and washers 72 need not be inset, but may instead bear against the exterior faces of the urethane body, the bores 66 in the urethane being eliminated. (A bore sufficient for the piston rod itself would, however, remain.) If it is desired to be able to move the piston to the ends of its cylinder, the cylinder will be provided with end caps to accommodate the projecting nuts and washers.

Further, only one nut 68 and washer 72 need be used, the other nut and washer being replaced by an enlarged step formed on the piston rod, against which step the urethane body may abut.

The invention as described has a number of advantages. One of the important advantages in machine tool applications is the fact that there are no thin flexible walls oriented in a direction in which they may flex when the piston reverses direction, i.e., there are no thin walls oriented transverse to the direction of movement of the piston. In the FIGS. 5 to 7 embodiments the lips 56, 56′ are relatively thin, but they are oriented in a direction substantially parallel to the direction of movement of the piston (particularly once the piston has been inserted in the cylinder), and they are supported or backed by the continuity of the sleeve between them. Therefore, there is substantially no possibility of flexing of any part of the sleeve in a direction parallel to the direction of movement of the piston, so the size of the discontinuity resulting from a change in piston direction is reduced to a minimum. Ths is extremely important in close machining since it reduces greatly the amount of finishing work required.

A second advantage of the invention, in comparison with pistons using rings, is that scoring and wear of the cylinder is reduced. This is because there is no metal to metal contact, and because small metal particles finding their way between the piston and cylinder tend to be absorbed by the urethane, which is relatively thick and is much softer than the metal cylinder wall. The refuse collector slots of the FIGS. 5 to 7 embodiments further assist in this regard. It is particularly desirable to immobilize metal particles in the cylinders of high accuracy metal working machinery, because the oil used in such cylinders is often controlled by sensitive valves honed to tolerances measured in the millionths of an inch. If particles enter these valves, the likelihood of damage is often high.

A further advantage of the construction described is that if a slight bend occurs in a piston rod, so that the piston is forced slightly askew in a cylinder, less damage will be caused to the cylinder than in the case of a metallic piston surface, where metal to metal rubbing occurs and tends to ruin the cylinder. With the invention, the relatively thick urethane sleeve or urethane body is simply compressed in the cylinder, the central slot in the exterior surface of the sleeve or urethane body acting as stress relief means.

This last feature is advantageous in applications where the piston rod is subjected to bend in stresses, e.g., in aircraft landing gear. When an aircraft lands, its landing gear is subject to considerable impact, and this occasionally tends to bend the piston rods of the pistons used to raise or lower the aircraft wheels. When such a piston rod is bent, this causes scoring and locking of the piston in its cylinder, and it may also cause loss of seal. The result is that raising or lowering of the landing gear is prevented.

Figure 8:
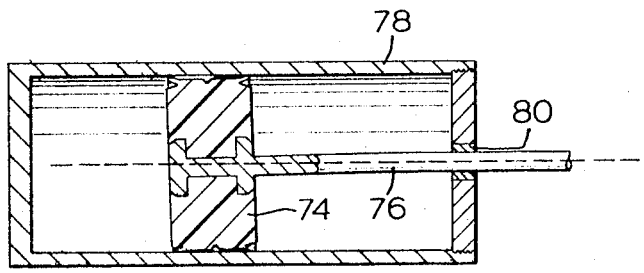
FIG. 8 is a side section showing diagrammatically the situation occurring when a piston rod is bent.

With the invention, slight bending of the piston rod will not cause total loss of seal, and as mentioned, the misalignment is absorbed by the urethane when a thick urethane body is used. This situation is somewhat diagrammatically illustrated in FIG. 8, which shows a urethane body 74 bonded to a piston rod 76, the assembly being mounted in a cylinder 78. In the FIG. 8 illustration, the piston rod is bent from a straight line by an amount intended to represent about 30 thousandths of an inch, thus deforming the piston. The piston will, however, still slide in the cylinder and maintain a reasonable degree of seal. A limiting factor in the amount of curvature that can be tolerated in the piston rod is the fact that beyond a certain degree of curvature or misalignment, the piston rod will jam in the gland 80 at the end of the cylinder.

The use of pistons made largely of urethane also saves weight, since urea-urethane elastomers have a density about one-third that of aluminum. This is useful in aircraft installations.

It may also be noted that if the cylinder is slightly out of round or distored in a localized area, this is compensated for by the urethane sleeve or body.

When pistons according to the invention are used in applications other than for machine tools and where slight axial flexing of the urethane does not matter, then the refuse collector slots (e.g., slot 48′ in FIG. 6) may be substantially widened and deepened (to save weight and material), so long as the strength of the remaining urethane body is sufficient for the application in question.

Although the piston core has been referred to as being metallic, it will be realized that other suitable hard materials may be used, provided that a bond can be formed between such materials, and the resilient sleeve. Pistons of the type described may be used in most commercial cylinders, air or liquid, so long as the temeprature does not exceed about 200° F.

I claim:
1. A piston for insertion in a cylinder having a predetermined diameter, said piston comprising:
 (a) an inner core of metal, said core being cylindrical in shape but having bevelled outer edges at each end thereof,
 (b) an outer sleeve of resilient, tough, material, resistant to creep and set under load, encircling said core and extending the length of said core, said sleeve being bonded firmly to said core over the entire length of its contact with said core,
 (c) said sleeve, at its ends, being of a first diameter slightly greater than said predetermined diameter, and said sleeve having between its ends a middle portion of a second diameter slightly less than said predetermined diameter, the outer surface of said sleeve tapering gently, at a predetermined angle relative to the axis of said cylinder, from said ends to said middle portion,
 (d) each end face of said sleeve having, adjacent the outer surface of said sleeve, a V-shaped axial recess extending over the entire length of the respective bevelled outer edge ,said recess being defined by a first surface slanting axially and radially outwardly from said end face, and a second surface meeting said first surface and slanting axially and radially outwardly from its intersection with said first surface towards said end face, said first surface being substantially parallel with said bevel to define a relatively thin layer of said material overlying said bevel, said second surface being oriented at an angle slightly greater relative to the axis of said cylinder than said predetermined angle to form a relatively thin outer lip in said end face near the outer surface of said sleeve,
 (e) said material being a urea-urethane elastomer having a Bashore Rebound elasticity value of between about 30 percent and 50 percent, a hardness of between about 95 Shore A and 55 Shore D, an A.S.T.M. Die C resistance to tearing value of at least 500 pounds per square inch, and an elongation at break of at least 400 percent.

2. A piston according to claim 1 wherein said sleeve includes at least one and no more than two circumferential slots therearound in its middle portion, said slots acting as refuse collectors tending to trap refuse working its way from one side of said piston to the other.

References Cited

UNITED STATES PATENTS

| | | | |
|---|---|---|---|
| 2,994,571 | 8/1961 | Peras | 92—243 X |
| 3,172,341 | 3/1965 | Garrett | 92—243 |
| 2,176,595 | 4/1965 | Schwartz | 92—243 |
| 3,354,794 | 11/1967 | Dailey | 92—243 |

CARROLL B. DORITY, JR., Primary Examiner